United States Patent

Goldman et al.

[11] Patent Number: 4,620,924
[45] Date of Patent: Nov. 4, 1986

[54] AQUARIUM CORNER FILTER

[75] Inventors: Jerome Goldman, New York; Marvin Goldman, Great Neck; Gerald Phillips, Glen Cove; Terry Goldman, New York; John Judy, Hempstead, all of N.Y.

[73] Assignee: Penn Plax Plastics, Inc., Garden City, N.Y.

[21] Appl. No.: 662,838

[22] Filed: Oct. 19, 1984

[51] Int. Cl.$^4$ .................. E04H 3/16; E04H 3/20
[52] U.S. Cl. ................... 210/169; 210/234; 210/238; 210/416.2
[58] Field of Search ............... 119/3, 5; 210/169, 238, 210/416.2, 234, 94

[56] References Cited

U.S. PATENT DOCUMENTS

| 3,477,580 | 11/1969 | Willinger | 210/169 |
| 3,717,253 | 2/1973 | Lovitz | 210/169 |
| 3,720,317 | 3/1973 | Willinger | 210/169 |
| 4,186,093 | 1/1980 | Willinger | 210/169 |
| 4,206,054 | 6/1980 | Moore et al. | 210/169 |
| 4,501,659 | 2/1985 | Henk | 210/169 |

Primary Examiner—Andrew H. Metz
Assistant Examiner—Sharon T. Cohen
Attorney, Agent, or Firm—R. Scott Goldman

[57] ABSTRACT

A water filter for use inside of an aquarium which is characterized by the fact that filter cavity housing is removably attached to a sleeve unit which is in turn attached to the inside wall of the aquarium. When the filter material in the filter unit must be changed, the filter cavity housing may be removed from the sleeve unit which remains attached to the wall of the aquarium. The water current generating mechanism of the filter unit is also connected to the sleeve unit so that it does not have to be disconnected when the filter material is changed. The filter unit of the present invention is adapted for use with a cartridge type filter material in a preferred embodiment of the invention.

20 Claims, 7 Drawing Figures

AQUARIUM CORNER FILTER

BACKGROUND OF THE INVENTION

The present invention relates generally to a filter for cleaning the water in an aquarium used to keep fish. More particularly this invention relates to a filter for cleaning aquarium water which is completely submerged in the water of the aquarium when in use, and draws water into and through a cavity in the filter housing. This filter cavity is filled with a filtering material in order to trap debris and particulate matter present in the aquarium water.

The present invention finds use in cleaning different types of debris material from the water of an aquarium used to house fish. It is suited for use in the general upkeep of the aquarium by the home aquarium hobbyist, by the researcher in a laboratory setting, or in similar circumstances.

A water filtering system is an essential component in order to maintain fish in an aquarium setting. In the home hobbyist aquarium, laboratory aquarium, or in similar settings where low volume tanks of about 5 to 40 gallons are used, it is customary to filter the aquarium water with a filter which sits in the fish tank, fully submerged in the water. Filtering is accomplished by forcing water into the body cavity of the filter through a system of slits and/or holes and out of the body cavity through a second system of slits and/or holes. The filter cavity is filled with a filtering material which entraps the debris and other particulate matter commonly found in fish tank water.

A common means of forcing the water into and through the filtering material containing cavity is by employing a bubbling mechanism attached to an air source outside of the fish tank by a length of air hose or air tubing. This causes bubbles to form at a low point in a chamber attached to the filter cavity by a common passageway. When the formed bubbles rise toward the surface of the aquarium water, a current is formed which draws water from the aquarium into the filter cavity. The water passes through filtering material in the filter cavity and then out of the filter cavity following the current established by the bubbles. This means of drawing the water through the filter cavity also provides desired aeration to the aquarium water which is beneficial for the maintenance of the fish.

The above described filtering system is know in the art as a corner filter, or box type filter. In using these filters two major drawbacks are encountered. First of all, it is extremely difficult to position the filter in the fish tank in a manner so that it remains submerged in the water for use as a filter. There is a tendency for the filter to rise up to the top of the tank if not securely positioned for use, especially when air is blown into the system to form the necessary water current. In order to solve this problem it is common to place the filter cavity upon a base unit which may be buried under the bottom material of the aquarium. This bottom material, often a gravel type substance, holds the base and filter unit under the aquarium water and prevents it from floating to the surface.

A major problem is encountered when the filter unit is kept in position by this method of burying the base under the bottom gravel type material. The filtering material inside of the filter cavity must be changed on a regular basis in order for it to function properly in cleaning the fish tank water. When the filtering material is changed the base of the filter must be pulled out of the gravel material, and the entire filter must be removed from the fish tank. This often causes the aquarium water to become excessively cloudy. Further, the pulling out of the filter unit and base often disrupts the other items positioned in the aquarium. When the filtering material is changed the filter must then be fully repositioned in the aquarium causing further disruption and clouding.

It is also known in the art to position a box or corner type filter within the aquarium by attaching it to the wall of the aquarium. Often suction cups are used to attach the filter to the wall of the aquarium. While less disruption is caused when the filtering material used in this type of filter is changed, the entire filter must be removed from the tank. Again, the filter must be fully repositioned in the tank after the filtering material is changed. In order to clean the filter cavity the air tubing from the outside air source must be disconnected from the filter. Repositioning the filter in the tank and reconnecting the tubing can be difficult, messy, and often results in disruption to the fish tank.

A second drawback encountered with the use of a corner or box type filter also involves changing the filtering material. Filtering material generally used in these types of filters consist of two components. There is a coarse granular material, such as charcoal, or activated carbon which is suitable for absorbing the debris. Also commonly used is a floss material such as glass wool, or polyester floss, which can trap the debris. When these materials are wet and dirty with fish tank debris they are difficult to handle without causing a great mess. Particularly, the coarse material sticks to the walls of the filter cavity and is difficult to remove.

To remedy this drawback involving the changing of the filtering material it has been known in the art to form a cartridge with the coarse filtering material on the inside, and the floss material forming the outer walls of the cartridge. The filter cartridge and the cavity of the filter are formed in such a manner so that the filter cartridge may be placed into the filter cavity to perform the filter function, and easily removed from the cavity so that it can be replaced with a clean cartridge. The slit and/or hole system and the means of drawing the water through the filter cavity are adapted so that the water passes through the filter cartridge. The filter cartridge system allows for efficient cleaning of the aquarium water, but allows the filtering material, and particularly the coarse material, to be quickly and easily replaced.

The aquarium filter of the present invention is of the type which is attached to the side wall of the aquarium preferably in the corner of the tank. The invention defined by the claims is directed to the problems relating to repositioning of the filter and reconnecting of the filter tubing which are encountered in the use of known filter units of this type. The present filter unit is provided with a sleeve unit which may be attached to the inside wall of the aquarium. The walls of the sleeve unit when in contact with the back wall of the filter cavity housing forms a chamber for the passage of the water and air bubbles. This sleeve unit has attached thereto a mechanism for producing the air bubbles necessary to establish the water current. The air tube from the outside air source is attached to the bubbling mechanism in the sleeve unit. The filter cavity housing is removably attached to the sleeve unit. When the sleeve unit is attached to the wall of the aquarium the filter cavity is secured in position on the inside of the aquarium by attaching the filter cavity housing to the sleeve unit. The filter cavity may be removed from the aquarium in order to change the filtering material by simply detaching the filter cavity housing from the sleeve unit. The sleeve unit remains securely in position on the wall of the aquarium. It is not necessary to reposition the sleeve unit in the tank. Therefore, when the filter material requires changing the filter cavity may be quickly and easily removed from the sleeve unit and then reattached to the sleeve unit which remains attached to the aquarium wall. Because of this there is little or no disruption to the aquarium, and excessive clouding does not occur. Also, since the bubbling mechanism and air tubing are positioned on the sleeve unit the attachment to the outside air source may be maintained during the operation of changing the filter material in the filter cavity. By eliminating the necessity to disconnect, and reconnect the air tubing, the filter material may be changed in a quick, easy and efficient manner with a minimum of disruption to the aquarium.

Further, a preferred embodiment of the present invention incorporates, in addition to the above described sleeve mounting unit, the ability to use a cartridge filter material. The filter cavity is formed in such a manner so that it can accept a cartridge and so that the water is drawn through the cartridge when the filter is in use. By the combination of these two features the present invention forms an extremely effective filtering system which allows for quick and efficient changing of the filtering material. When the filter cavity housing is disconnected from the sleeve unit, the soiled filtering material cartridge may be shaken out of the filter cavity without requiring the hobbyist to contact the soiled cartridge. The filter of this invention thereby provides for the proper maintenance of clean aquarium water with a minimum of mess, effort and disruption of the aquarium.

SUMMARY OF THE PRESENT INVENTION

It is an object of the present invention to provide an inside the tank aquarium filtering system which effectively cleans the water in small to medium size aquarium fish tanks.

It is a further object of the present invention to provide an inside the tank aquarium filtering system which allows for the changing of the filtering material inside the filter cavity without requiring the complete repositioning of the filter unit, and without causing the disruption of the aquarium which results from this repositioning.

It is another object of the present invention to provide an inside of the tank aquarium filtering system which allows for changing of the filtering material inside the filter cavity without the necessity of disconnecting and reconnecting the aquarium air line tubing.

It is a still further object of the present invention to provide an inside of the tank filtering system which has the above described benefits, and further allows for the use of easy to change cartridge style filtering material.

Furthermore, it is an object of the present invention to provide an inside the tank filtering system which allows for the ability to see the filtering material without removing the filter from the fish tank.

The present invention is a filtering unit for an aquarium fish tank which is used for removing debris and other particulate matter from the aquarium water. It functions while completely submerged in the water of the aquarium by drawing water into a filter cavity filled with a filtering material. The water is drawn through the filter cavity and filtering material by establishing a current with air bubbles produced from a bubbling mechanism which is attached to a source of air on the outside of the tank by connection with an air tube. The bubbling mechanism may simply be the opened end of the air line tubing which will produce air bubbles when air is pumped through the tube. It is preferable if a conventional air stone is used as the bubbling unit to enhance the bubbling effect.

The filter unit is positioned in the aquarium tank by attaching a sleeve unit to the wall of the tank by means of an attachment mechanism. Suitable attachment mechanisms must securely attach the sleeve to the wall of the tank while allowing for removal if necessary. Such devises may be hanging hooks, clips, suction cups or the like. Suctions cups have been found preferable for the purposes of the present invention.

In the sleeve unit is a means for securing a length of air tubing and the bubbling mechanism, to allow for them to remain stationary in the sleeve unit. The air tubing and bubbling mechanism are attached in such a way that they do not interfere with the removal of the filter cavity, so that the attachment to the outside air source need not be disconnected when the filter material is changed. The air tubing and bubbling mechanism may be secured to the sleeve unit by any means including water resistant glue, clips, or mountings or holes formed on the sleeve unit.

The filter cavity is a chamber into which the filtering material is placed. It is formed from the filter cavity housing and must have an opening for inserting and removing the filtering material. The opening is preferably a securely fitting cover formed from one wall of the filter cavity housing. This allows for clean and fast removal and replacement of the filtering material. In the preferred embodiment of the present invention the opening in the filter cavity housing is large enough to allow for the filtering material, especially in the cartridge form, to be shaken out of the filter cavity. In this manner the hobbyist need not touch the soiled filter material to remove it from the filter cavity.

The filter cavity is removeably attached to the sleeve unit by an attachment means on the sleeve, and/or the outer wall of the cavity housing. This attachment means may be formed in any manner which is suitable for use under water and allows for quick and easy removal and attachment. Suitable means of attachment include plastic snaps, fish hook type fasteners, velcro and the like. A preferred method of attachment involves a slide in groove method with interlocking grooves on the sleeve and the outer wall of the filter cavity. Also, slit and prong mechanism can be used in conjunction with the slide in groove method or independently as the attachment means.

When attached the sleeve with the adjoining wall of the filter cavity forms a chamber for the air bubbles to rise through and pass out of a hole or passage in the top of the chamber. A hole is provided in the bottom of the filter cavity wall which is adjacent to the sleeve unit in order to allow the passage of water from the filter cavity into the chamber. In this manner, when the bubbles move up and out of the chamber, water is drawn through the filter cavity.

The filter cavity may be preferably formed in a manner so that it may accommodate a cartridge type filter material inside the cavity. The slit or hole system is arranged so that the water which flows into and through the cavity passes through the filter material.

The entire filter unit must be formed from a material which can withstand constant exposure to aquarium water. Plastic is a preferable material. The material may be either transparent, translucent or opaque. If the material forming the unit is translucent or opaque, it is desirable to place a window of transparent material, such as a clear plastic, in the wall of the filter cavity. This window enables one to view the filter material without taking the filter cavity out of the water. Use of the window allows the hobbyist to determine if the filter material must be changed without removing the filter from the fish tank.

BRIEF DESCRIPTION OF THE DRAWINGS

The above and other objects and the attendant advantages of the present invention will become readily apparent by reference to the following detailed description when considered in conjunction with the accompanying drawings wherein.

Like references refer to like parts throughout the several views of the drawings.

DETAILED DESCRIPTION OF THE PREFERRED EMBODIMENT

Figure 1:
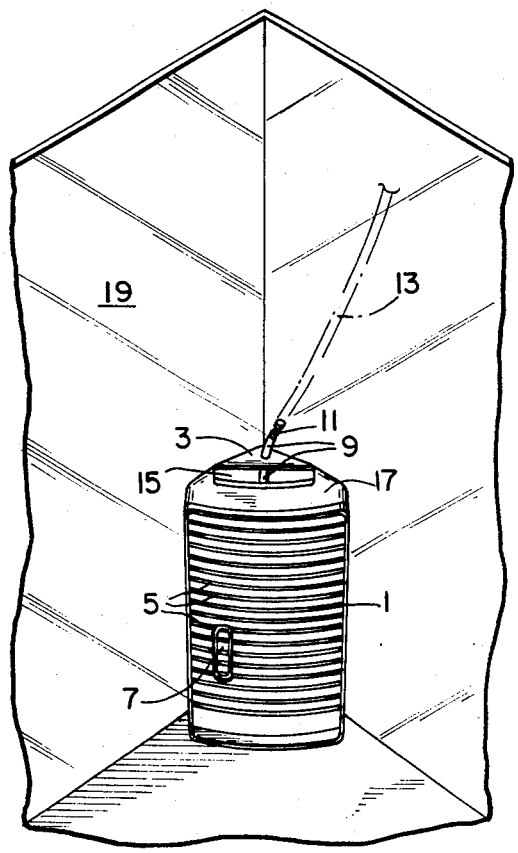
FIG. 1 is a perspective view of the preferred embodiment of the present invention when it is in position for use inside an aquarium.

FIG. 1 shows a perspective view of the preferred embodiment of the present invention. The filter unit is positioned in the corner of an aquarium 19. The filter cavity housing front cover wall represented by numeral 1 is provided with a plurality of slits 5 which allow water to enter into the filter cavity. There is also a window 7 in the filter cavity housing front cover wall 1 in order to allow one to see the filter material within the filter cavity. The front wall is preferably removably attached to the other walls of the filter cavity in order to allow easy access to the filtering material in the filter cavity.

The filter cavity outer wall is attached in the back to a sleeve unit 10. Internal air tubing 9 passes through the top wall of the sleeve unit 3 and is preferably provided with an air tubing connector 11 for attaching the filtering unit to external air tubing 13 which provides air from an outside source. Further, there is a space 15 between the wall of the top of the filter cavity housing 17 and the top of the sleeve unit 3, to allow for the passage of air bubbles and filtered water.

Figure 2:
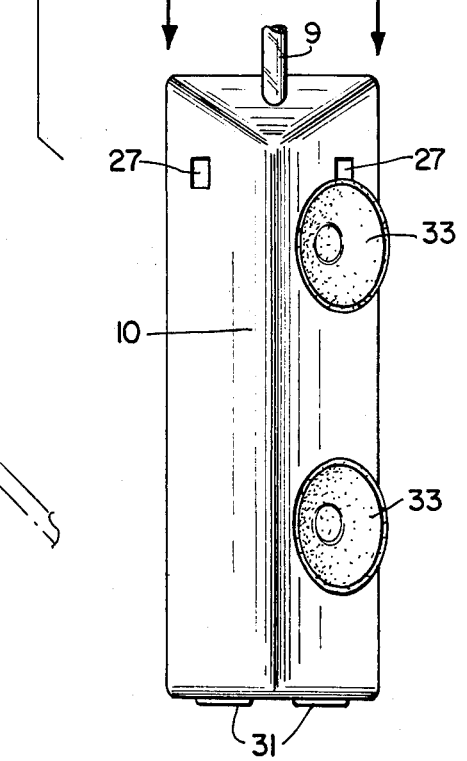
FIG. 2 is a top view of the filter unit when it is in position for use inside an aquarium.
Figure 3:
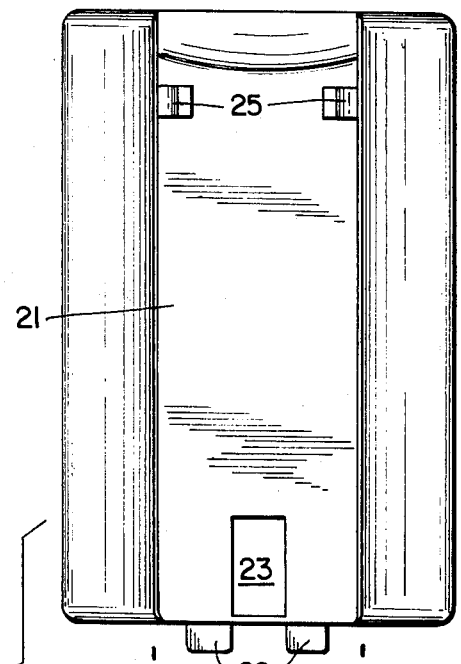
FIG. 3 is a view of the back wall of the filter cavity housing, and the back of the sleeve unit.
Figure 4:
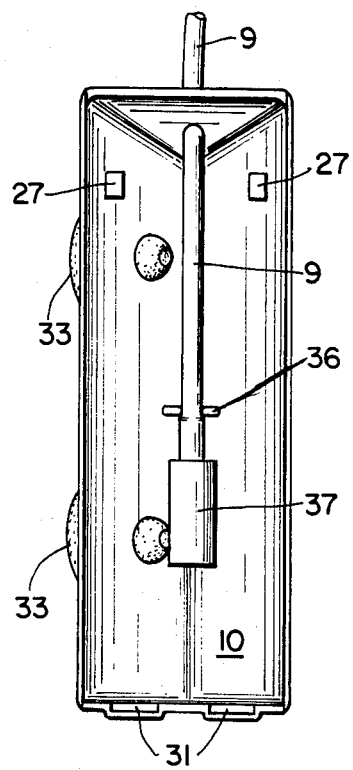
FIG. 4 is a front view of the sleeve unit of the preferred embodiment.
Figure 6:
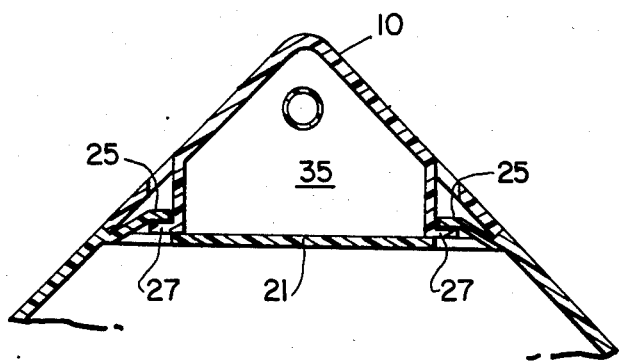
FIG. 6 is a horizontal cross sectional view of the sleeve unit and back wall of the filter cavity housing. The section is through the preferred slide in groove attaching means.

The back wall of the filter cavity housing 21 as illustrated in FIG. 3, has an opening 23 to allow for the passage of filtered water out of the filter cavity, and into the chamber 35 (FIG. 6) formed by the sleeve unit 10 and the back wall of the filter cavity housing 21. The chamber 35 is illustrated in FIG. 6, and may be seen in FIG. 4 without the back wall of the filter cavity. The water and air bubbles produced by a bubbler such as an air stone are expelled from the chamber 35 through the space 15 illustrated in FIGS. 1 and 2. The air stone 37 illustrated in FIG. 4 is connected to an outside source of air by the internal air tubing 9 which passes through the top of the sleeve unit 3, and then connects to the external air tubing 13 using tubing connector 11. The internal tubing 9 is securely fastened to the inside wall of the sleeve unit 10 by the mounting 36 on the inside wall.

Figure 5:
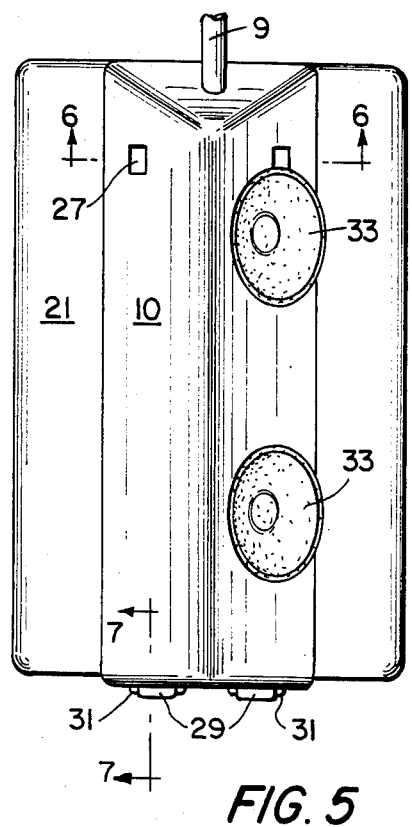
FIG. 5 is a back view of the filter unit with the filter cavity attached to the sleeve unit.
Figure 7:
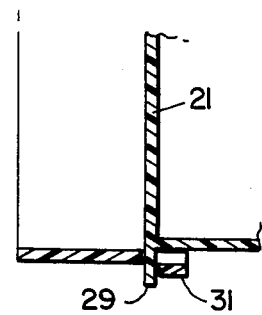
FIG. 7 is a vertical cross sectional view of the prong and slit attaching means of the preferred embodiment.

Further, the back wall of the filter cavity housing 21 is provided with a means of attaching the filter cavity to the sleeve unit 10. The attaching means illustrated in FIG. 3 are interlocking slide in grooves 25 on the back wall of the filter cavity housing 21, which interlock with similar grooves 27 on the sleeve unit 10. Also, the filter cavity wall 21 is attached to the sleeve unit 10 by prongs 29 projecting from the bottom of the back of the filter cavity wall 21. These prongs fit into slits 31 in the bottom of the sleeve unit 10, as illustrated in FIGS. 4 and 5. The interlocking slide in groove mechanism is illustrated in the cross section view of FIG. 6, and the slit and prong mechanism is illustrated in the cross sectional view in FIG. 7.

The sleeve unit 10 is also provided with a means of securely attaching it to the wall of the aquarium 19. In the pictured embodiment suction cups 33 are used as the attaching means. See FIGS. 2, 3, 4, and 5. The suction cups are attached to the sleeve unit in the preferred embodiment by projecting through the wall of the sleave unit 10 as illustrated in FIG. 4.

It is readily apparent that the above described filter unit meets all the objectives mentioned and also has other advantages for use in the aquarium. It should be understood that the specific form of the invention hereinabove described is intended to be representative only, as certain modifications within the scope of these teachings will be apparent to those skilled in the art of aquarium filtering units.

Accordingly, reference should be made to the following claims in determining the full scope of the invention.

What is claimed:

1. A water filter for use inside of an aquarium which comprises,
   (a) a filter cavity housing with means defining openings on at least one wall to allow the entry and exit of aquarium water through the interior of the filter cavity housing,
   (b) a sleeve unit which is removably attached to the filter cavity housing,
   (c) an attaching means, formed on at least one wall of the filter cavity housing and one wall of the sleeve unit, for removably attaching the filter cavity housing to the sleeve unit,
   (d) a means for attaching the sleeve unit to the wall of the aquarium, formed on the sleeve unit, and
   (e) a water current generating means for generating the flow of water into and through the interior of the filter cavity housing, the water generating means being powered by a bubbling mechanism which is attached to the sleeve unit in a manner wherein said bubbling mechanism remains stationary in the sleeve unit when the filter cavity is detached from the sleeve unit.

2. The water filter of claim 1 wherein the shape of the filter cavity housing, and the openings in the filter cavity housing wall are adapted to accommodate the use of a cartridge type filter material.

3. The water filter of claim 1 wherein the attaching means for attaching the sleeve unit to the wall of the aquarium comprises at least one suction cup.

4. The water filter of claim 1 wherein the attaching means for attaching the filter cavity housing to the sleeve unit comprises means defining one or more slide in groove connecting mechanisms.

5. The water filter of claim 1 wherein the attaching means for attaching the filter cavity housing to the sleeve unit comprises means defining one or more slit and prong connecting mechanism.

6. The water filter of claim 1 wherein the attaching means for attaching the filter cavity housing to means defining an sleeve unit comprises one or more slit and prong connecting mechanisms in addition to one or more slide in groove connecting mechanisms.

7. The water filter of claim 1 wherein the water current generating means comprises means defining open end of an air line tubing the other end of said air line tubing being adapted for connection to an outside air source.

8. The water filter of claim 1 wherein the water current generating means comprises an air stone adapted for connection to an outside supply of air.

9. The water filter of claim 1 wherein the sleeve unit and filter cavity housing are made of plastic materials.

10. The water filter of claim 9 wherein at least a portion of the plastic materials forming the filter cavity housing is transparent, creating a window in at least one wall of the filter cavity housing.

11. The water filter of claim 9 wherein the shape of the filter cavity housing, and the openings in the filter cavity housing wall are adapted to accommodate the use of a cartridge type filter material.

12. The water filter of claim 11 wherein the current generating means is attached to the sleeve unit by a mounting formed on the inside wall of the sleeve unit.

13. The water filter of claim 12 wherein the water current generating means comprises an air stone adapted for connection to an outside source of air.

14. The water filter of claim 11 wherein the means for attaching the sleeve unit to the wall of the aquarium comprises at least one suction cup.

15. The water filter of claim 14 wherein the means for removeably attaching the filter cavity housing to the sleeve unit comprises at least one slide in groove connecting mechanism.

16. The water filter of claim 15 wherein the means for removeably attaching the filter cavity housing to the sleeve unit further comprises at least one slit and prong connecting mechanism.

17. The water filter of claim 11 wherein a full wall of the filter cavity housing is removeably attached to the remaining walls of the filter cavity housing.

18. The water filter of claim 14 wherein at least a portion of the plastic materials forming the filter cavity housing wall is transparent, creating a window in at least one wall of the filter cavity housing.

19. The water filter of claim 14 wherein the water current generating means is an air stone adapted for connection to an outside air supply.

20. A water filter for use inside of an aquarium which comprises,
(a) a filter cavity housing made of plastic material at least a portion of which is transparent, with means defining openings on at least one wall to allow the entry and exit of aquarium water through the interior of the filter cavity housing, said filter cavity housing and openings being adapted to accommodate a cartridge type filter material,
(b) a sleeve unit made of a plastic material which is removably attached to the filter cavity housing by at least one slide in groove connecting mechanism,
(c) a means for attaching the sleeve unit to the wall of the aquarium, formed on the sleeve unit, comprising at least one suction cup,
(d) a water current generating means, for generating the flow of water into and through the interior of the filter cavity housing, the current generating means being powered by a bubbling mechanism comprising an air stone adapted for connection to an outside supply of air and wherein the bubbling mechanism is attached to the sleeve unit in a manner wherein said bubbling mechanism remains stationary in the sleeve unit when the filter cavity is detached from the sleeve unit.

* * * * *